No. 861,499. PATENTED JULY 30, 1907.
M. CARROLL.
CEMENT PARTITION.
APPLICATION FILED MAY 9, 1906.
2 SHEETS—SHEET 2.
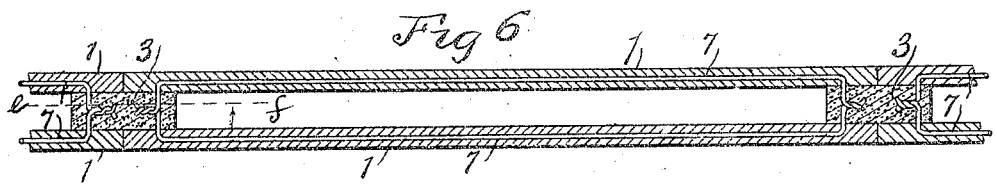
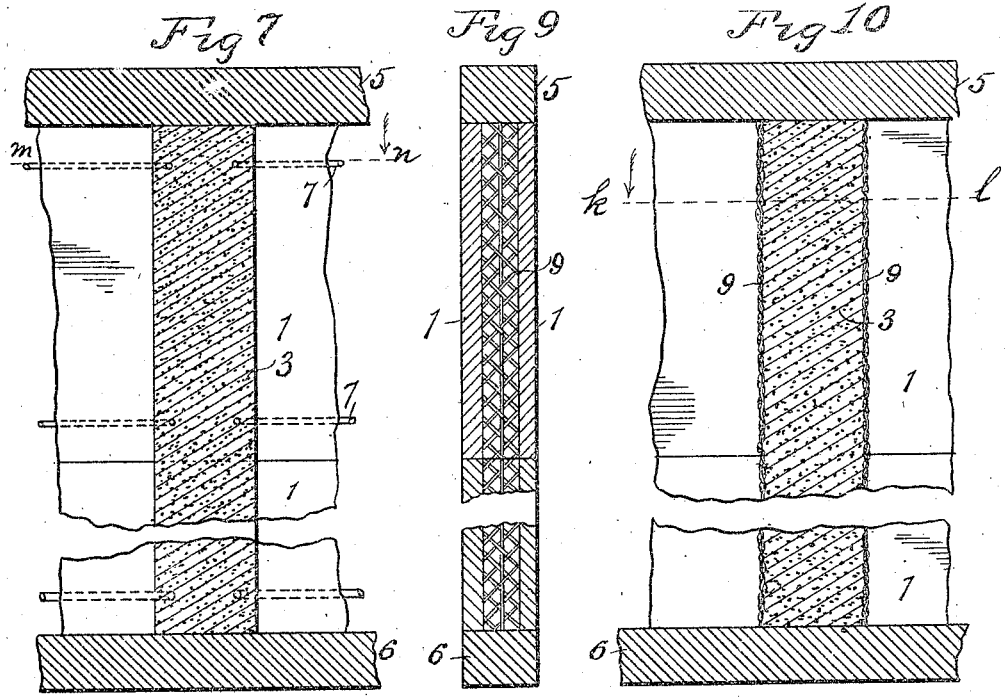
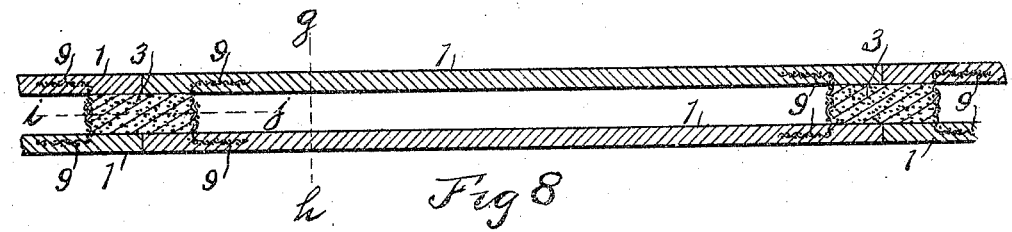
Witnesses:
R. E. Hamilton
E. B. House
Martin Carroll Inventor
By His Attorney
Warren D. House

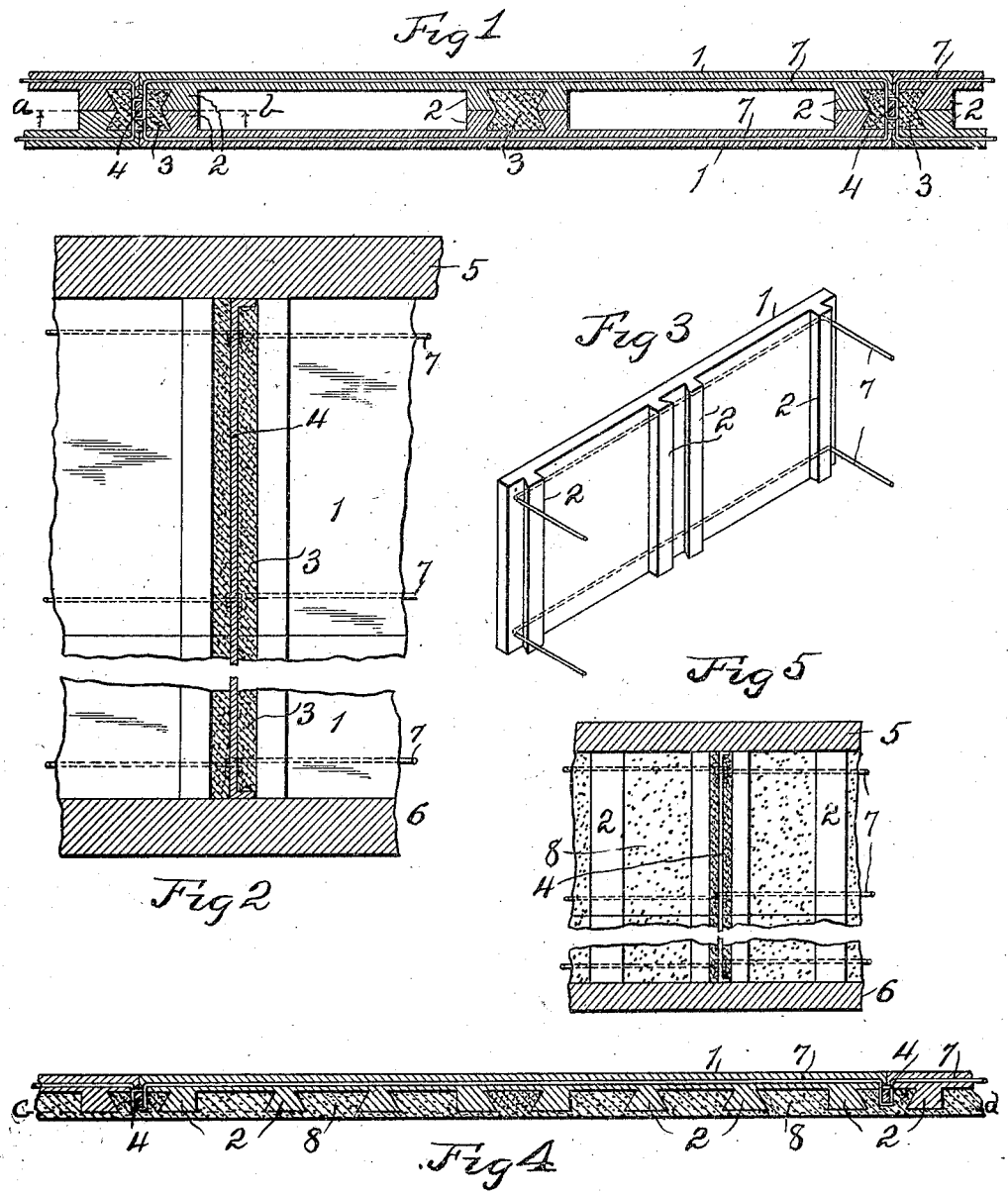

UNITED STATES PATENT OFFICE.

MARTIN CARROLL, OF KANSAS CITY, MISSOURI.

CEMENT PARTITION.

No. 861,499.

Specification of Letters Patent.

Patented July 30, 1907.

Application filed May 9, 1906. Serial No. 315,960.

*To all whom it may concern:*

Be it known that I, MARTIN CARROLL, a citizen of the United States, residing at Kansas City, in the county of Jackson and State of Missouri, have invented certain new and useful Improvements in Cement Partitions, of which the following is a specification.

My invention relates to improvements in cement partitions.

The object of my invention is to provide a partition made of cement plates disposed vertically edge on edge, the plates being supported by means of vertical cementitious studs secured to top and bottom supports.

A further object of my invention is to provide a partition made principally of cement plates, which shall be comparatively light, strong, durable and cheaply constructed.

Other novel features of my invention are hereinafter fully described and claimed.

In the accompanying drawings illustrative of my invention, Figure 1 is a horizontal sectional view of a partition formed of two parallel series of plates, the plates of each series having vertically grooved flanges between which are molded the vertical cementitious studs, the flanges being grooved adjacent the studs so as to interlock therewith. Fig. 2 is a vertical sectional view taken on the dotted line *a—b* of Fig. 1. Fig. 3 is a perspective view of one of the cement plates. Fig. 4 is a horizontal sectional view, of a form of my invention in which but one series of vertical plates is employed. Fig. 5 is a vertical sectional view taken on the dotted line *c—d* of Fig. 4. Fig. 6 is a horizontal sectional view of a modified form of my invention in which the flanges and rigid bars are dispensed with, the view being taken on the dotted line *m—n* of Fig. 7. Fig. 7 is a vertical sectional view taken on the dotted line *e—f* of Fig. 6. Fig. 8 is a modified form of my invention in which the rigid bars are dispensed with, as well as the vertical flanges, the plates of opposite series being connected to each other by vertical wire cloth embedded in the plates, the view being taken on the dotted line *k—l* of Fig. 10. Fig. 9 is a vertical sectional view taken on the dotted line *g—h* of Fig. 8. Fig. 10 is a vertical sectional view taken on the dotted line *i—j* of Fig. 8.

Similar characters of reference denote similar parts.

Referring to Figs. 1, 2 and 3, this partition comprises two vertical parallel series of thin plates 1, the plates of each series being disposed edge on edge one above the other, and the plates adjacent their vertical edges having vertical flanges 2, the adjacent sides of said flanges of contiguous plates being vertically grooved, and in the spaces between the flanges are molded vertical cementitious studs 3 which fill the said vertical grooves and thus interlock with the flanges of opposite pairs of the two series of plates. Embedded in each stud 3 is a vertical rigid bar, preferably of iron, and denoted by 4, the ends of which are respectively secured to top and bottom supports comprising the joists 5 and 6 respectively. Embedded longitudinally in the plates 1 are wires 7 having projecting ends adjacent the ends of each plate 1, which projecting ends are embedded in the adjacent studs 3 and secured to the bars 4.

As shown in Fig. 1, the plates 1 may be provided each between the end flanges with similar central grooved flanges, also disposed in pairs located opposite corresponding pairs of the opposite series of plates. In this case also, the spaces between the flanges of corresponding pairs is filled with cementitious material forming a stud 3.

In the form shown in Figs. 3 and 4, the partition is formed of but a single series of plates 1, having the flanges 2, bars 4 and wires 7 already described. The bars 4 are also secured in a like manner to the supports 5 and 6. In this form more flanges 2 may be provided on each plate and all of the spaces between the flanges being filled with cementitious material 8.

In the form shown in Figs. 6 and 7, the flanges are dispensed with, as are also the rigid bars. In this form the wires 7 have their projecting ends united to the corresponding ends of the wires in the opposite plates, the united ends being embedded in the studs 3.

In the form shown in Figs. 8, 9 and 10, the bars and flanges are not used, and wire cloth pieces 9 are substituted for the wires 7. The said wire cloth pieces being embedded vertically adjacent the ends of the plates and having their projecting ends entwined with the adjacent ends of the wire cloth pieces in opposite plates. In this form of my invention the wire cloth pieces 9 may be used to form two sides of the mold for molding each stud 3.

My invention may be modified in other ways within the scope of the appended claims without departing from its spirit.

Having thus described my invention, what I claim and desire to secure by Letters Patent, is:—

1. In a partition, the combination with a plurality of thin vertical plates disposed edge on edge one above the other and having embedded therein laterally projecting wires, of a vertical cementitious stud, a rigid bar vertically embedded in said stud and having attached thereto said projecting wires.

2. In a partition, the combination with a plurality of thin vertical plates disposed edge on edge one above the other and having embedded therein laterally projecting wires, of a vertical cementitious stud, a rigid bar vertically embedded in said stud and having attached thereto said projecting wires, and top and bottom supports to which said bar is secured.

3. In a partition, the combination with a plurality of thin vertical plates disposed edge on edge one above the other and having each embedded therein wires which project adjacent the ends of the plate, of a plurality of vertical cementitious studs disposed respectively adjacent the vertical joints of the plates and having embedded therein the adjacent projecting wires, and a plurality of vertical rigid bars embedded one in each stud, each bar having attached thereto the adjacent wires.

4. The combination with a plurality of vertical plates disposed edge on edge one above the other, said plates having adjacent their vertical edges vertical flanges alining with the flanges of plates above and below, said plates having wires embedded therein which project into the spaces between flanges adjacent the abutting ends of adjacent plates, of cementitious studs molded in vertical position between the adjacent flanges of adjacent plates and having embedded therein the projecting adjacent wires.

5. In a partition, the combination with a plurality of vertical plates disposed edge on edge one above the other, said plates having adjacent their vertical edges vertical flanges alining with the flanges of plates above and below, the adjacent sides of adjacent flanges on contiguous plates being vertically grooved, said plates having wires embedded therein which project between the flanges of adjacent plates, of cementitious vertical studs molded between the adjacent flanges of contiguous plates and in said grooves therein and having embedded therein the adjacent projecting wires.

6. In a partition, the combination with a plurality of vertical plates disposed edge on edge one above the other, said plates having adjacent their vertical edges vertical flanges alining with the flanges of plates above and below, said plates having wires embedded therein which project into the spaces between adjacent flanges of contiguous plates, the adjacent sides of adjacent flanges of contiguous plates being vertically grooved, of cementitious studs molded vertically between adjacent flanges of contiguous plates and filling the grooves in said flanges and having said adjacent projecting wires embedded in said studs, and vertical rigid bars embedded one in each stud and having secured thereto the adjacent projecting wires respectively.

7. A partition comprising two parallel series of vertical plates, each series disposed with the plates set edge on edge one above the other, and the plates of each series having adjacent their vertical edges vertical flanges disposed opposite to the flanges of the opposite plates, the adjacent sides of adjacent flanges of the contiguous plates of each series having vertical grooves, of vertical cementitious studs molded in the space between the adjacent flanges of both series and filling the grooves in said flanges.

8. In a partition, the combination with two vertical parallel series of plates, of vertical cementitious studs molded between opposite series, vertical rigid bars embedded one in each stud, wires molded in the plates of each series and having projecting ends secured to the adjacent bars.

9. In a partition, the combination with two vertical parallel series of plates, of vertical cementitious studs molded between opposite series, vertical rigid bars embedded one in each stud, top and bottom supports to which said bars are secured, wires embedded in the plates of each series and having projecting ends embedded in said studs and secured to said bars.

10. In a partition, the combination with two vertical series of plates, each series having pairs of vertical flanges disposed opposite to corresponding pairs on the adjacent sides of the other series, the adjacent sides of the flanges of each pair being vertically grooved, of vertical cementitious studs molded between the flanges of each pair and filling the grooves therein, and vertical rigid bars embedded one in each of said studs.

11. In a partition, the combination with two vertical series of plates, each series having pairs of vertical flanges vertically grooved on their adjacent sides and disposed opposite to corresponding pairs of flanges on the adjacent sides of the opposite series, of vertical cementitious studs molded between the flanges of each pair and filling the grooves therein, and wires embedded in the plates of each series and having projecting ends embedded in said studs respectively.

12. In a partition, the combination with two vertical parallel series of plates, each series having pairs of vertical flanges grooved on their adjacent sides and disposed opposite to corresponding pairs of flanges on the adjacent sides of the opposite series, of vertical cementitious studs molded between the flanges of opposite pairs and filling the grooves in said flanges, rigid vertical bars embedded one in each of said studs, and wires embedded in the plates of each series and having projecting ends embedded in said studs respectively and secured to the adjacent bars.

13. In a partition, the combination with two vertical parallel series of plates, each series having pairs of vertical flanges disposed opposite respectively to similar pairs on the adjacent sides of the other series, of vertical cementitious studs molded between the flanges of each pair, rigid bars embedded vertically one in each of said studs, and wires embedded in the plates of each series and having projecting ends embedded in adjacent studs and secured to the bars embedded therein.

14. In a partition, the combination with two vertical parallel series of plates, each series having pairs of vertical flanges disposed opposite to corresponding pairs of the opposite series, of vertical cementitious studs molded between the flanges of each pair, rigid vertical bars embedded one in each stud, top and bottom supports to which said bars are secured, and wires embedded in the plates of each series and having projecting ends embedded in the adjacent studs and secured to the adjacent bars.

15. In a partition, the combination with two vertical parallel series of plates, each series having pairs of vertical flanges disposed opposite corresponding pairs on the adjacent sides of the opposite series, the adjacent sides of the flanges of each pair being vertically grooved, of vertical cementitious studs molded between the flanges of the corresponding pairs and filling the grooves in said flanges, vertical rigid bars embedded one in each stud, and top and bottom supports to which said bars are secured.

16. A partition plate comprising a cementitious body having on one side adjacent its vertical edges vertical flanges, each vertically grooved on the side adjacent the adjacent vertical edge of the plate, a space being provided between each vertical edge of the plate and the adjacent flange, and one or more wires embedded in the plate and having ends projecting from the flanged side of the plate in the spaces intermediate said flanges and the adjacent vertical edges of the plate.

In testimony whereof I affix my signature in presence of two witnesses.

MARTIN CARROLL.

Witnesses:
  WARREN D. HOUSE,
  HENRY F. ROSE.